Sept. 26, 1950 — E. L. PARR — 2,523,716
HYDRAULIC COUPLING
Filed Nov. 18, 1946
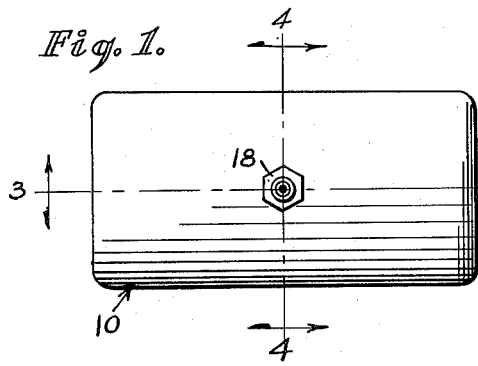
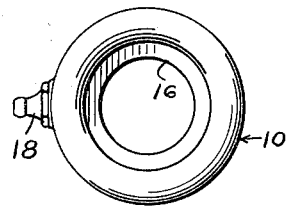
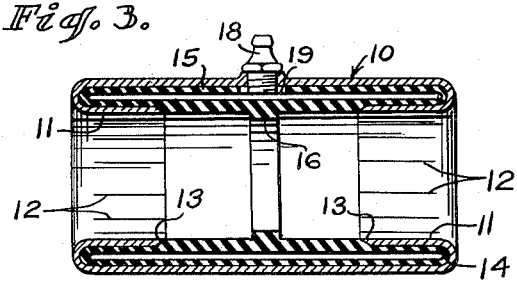
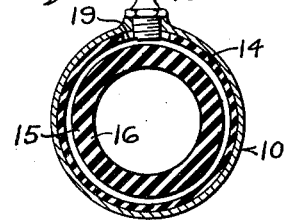
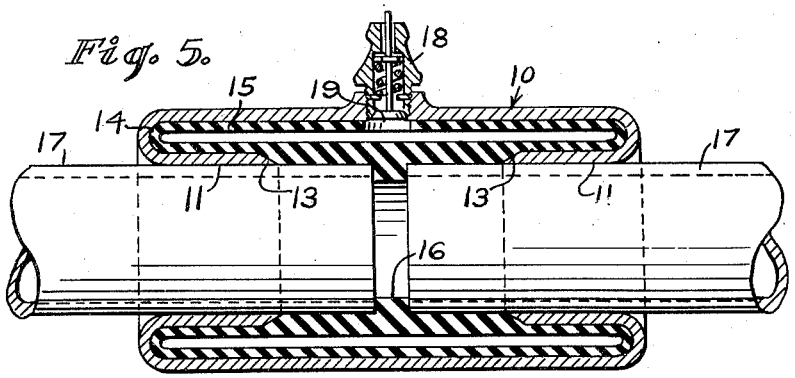
INVENTOR.
Edward L. Parr
BY Victor J. Evans & Co.
ATTORNEYS Patented Sept. 26, 1950

2,523,716

UNITED STATES PATENT OFFICE 2,523,716

HYDRAULIC COUPLING

Edward L. Parr, Mason, Nev.

Application November 18, 1946, Serial No. 710,728

3 Claims. (Cl. 285—109)

This invention relates to a hydraulic pipe coupling that is adapted to quickly assemble pipe connections in an easy and efficient manner.

An object of the invention is to provide a hydraulic pipe coupling that is quickly and easily removed when the oil is released within the coupling.

Another object of the invention is to provide a hydraulic pipe coupling that, under pressure, is a positive seal against leakage of any type.

With the above and other objects and advantages in view, the invention consists of the novel details of construction, arrangement and combination of parts more fully hereinafter described, claimed and illustrated in the accompanying drawing in which:

Figure 1 is an elevational view of an embodiment of the invention;

Figure 2 is an end elevational view thereof;

Figure 3 is a longitudinal sectional view on the line 3—3 of Figure 1;

Figure 4 is a transverse sectional view on the line 4—4 of Figure 1 and

Figure 5 is a longitudinal sectional view with the pipe connections in place in the coupling.

Referring more in detail to the drawing, the reference numeral 10 designates a steel cylinder which is bent inwardly at each end to form the inturned flanges 11 which are provided with parallel relatively spaced slits 12. The inner end of the flange is bevelled at 13, and the slits 12 extend from the bevel toward the inturned portion of the flange.

The flange 11 is spaced from the inner walls of the cylinder 10 to form a compartment 14 in which is positioned a flat cylindrical rubber tube 15. At the inner center portion of the tube 15 there is formed an inwardly extending ring 16 which forms an abutment for the inner ends of the pipes 17 when the pipes are joined by the coupling.

A spring pressed valve 18 is threadably mounted at the center of the cylinder 10, and communicates with the tube 15 through the opening 19.

In use, threadless pipe is inserted into the cylinder 10 as shown in Figure 5. Then fluid under pressure is forced into the tube 15 through the valve 18. As the pressure within the tube increases, the slotted parts of the flange formed by the slits 12 are pressed into the pipe, thus locking it in place in the coupling.

There has thus been provided, a coupling that can be used for connecting two pipes together as a reducer, a T joint, an elbow or other similar connections for pipes.

It is believed that from the foregoing description, the structure and operation of the invention will be apparent to those skilled in the art, and it is to be understood that changes in the minor details of construction, arrangement and combination of parts may be resorted to, provided they fall within the spirit of the invention, and the scope of the appended claims.

Having thus described the invention, what is claimed as new and desired to be secured by Letters Patent is:

1. A device of the character described, comprising a cylinder, inturned flanges on the ends of said cylinder, said flanges having a bevelled forward edge and slits extending from said edge inwardly of said flange, a flat cylindrical shaped rubber tube in said cylinder, a ring formed on the inner wall of said tube centrally thereof, and a spring pressed valve in said cylinder and communicating with said tube whereby fluid under pressure may be forced into said tube to expand said flange inwardly to clamp the ends of pipes inserted in said cylinder.

2. A device of the character described, comprising a cylindrical body, clamping means on the end of said body, means in said body for expanding said clamping means on articles to be clamped within said body, and said clamping means comprising a split inturned flange.

3. A device of the character described, comprising a cylindrical body, clamping means on the end of said body, means in said body for expanding said clamping means on articles to be clamped within said body and said clamping means comprising a split inturned flange and said expanding means comprising a rubber tube, and a spring pressed valve is provided at the center of said body for admitting fluid under pressure into said tube.

EDWARD L. PARR.

REFERENCES CITED

The following references are of record in the file of this patent:

UNITED STATES PATENTS

| Number | Name | Date |
|---|---|---|
| 1,803,665 | Dennis | May 5, 1931 |
| 2,226,304 | Dillon | Dec. 24, 1940 |

FOREIGN PATENTS

| Number | Country | Date |
|---|---|---|
| 29,727 | Germany | Apr. 27, 1884 |